Feb. 18, 1936. E. J. GRAF Re. 19,859
ILLUMINATED ORNAMENTAL DEVICE
Original Filed June 28, 1932
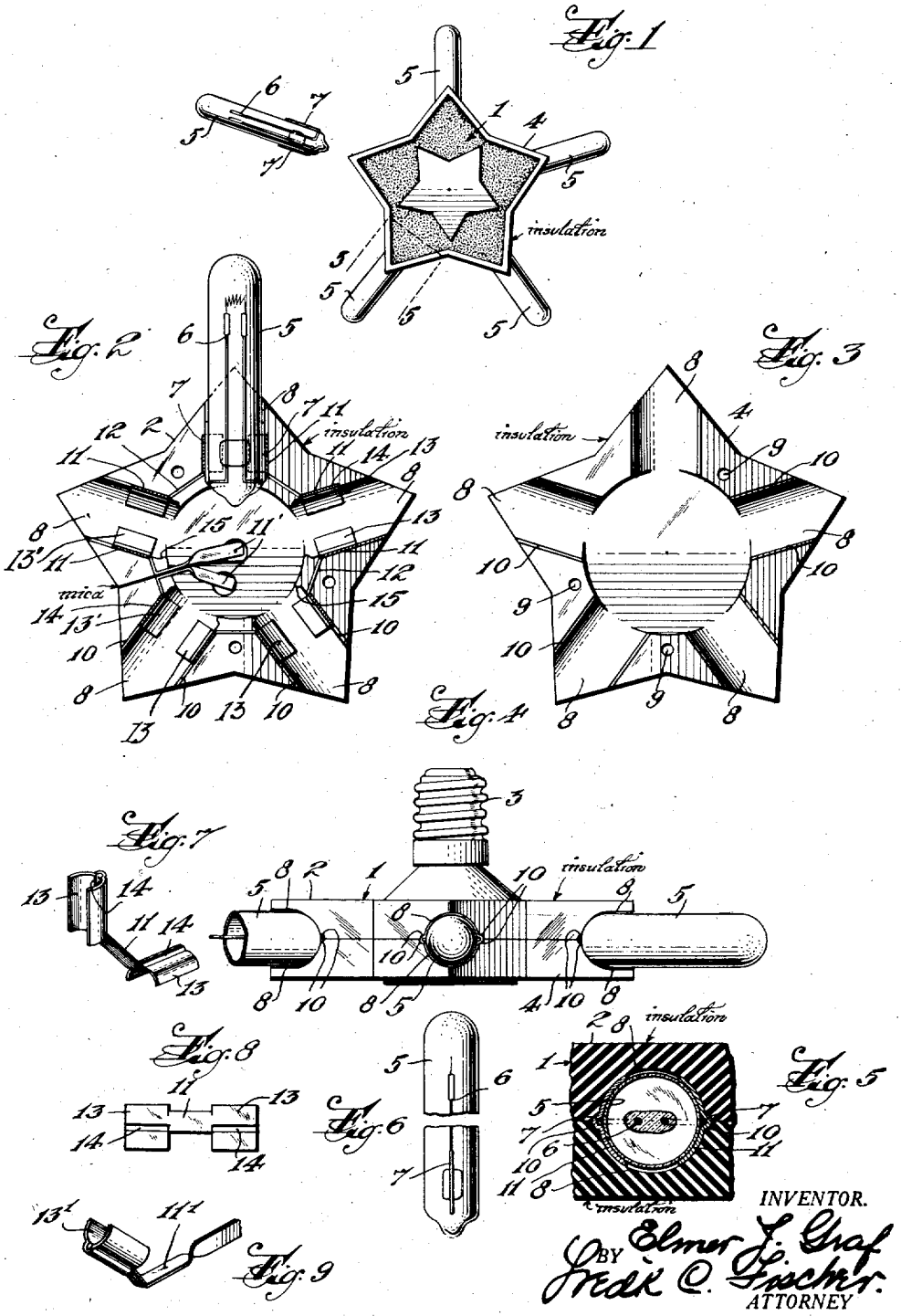

Reissued Feb. 18, 1936

Re. 19,859

UNITED STATES PATENT OFFICE 19,859

ILLUMINATED ORNAMENTAL DEVICE

Elmer J. Graf, Roselle Park, N. J., assignor to G. B. G. Corporation, Newark, N. J., a corporation of New Jersey Original No. 1,977,126, dated October 16, 1934, Serial No. 619,697, June 28, 1932. Application for reissue March 16, 1935, Serial No. 11,507

7 Claims. (Cl. 240—10)

My invention relates to improvements in illuminated ornamental devices and more particularly to illuminated ornamental electrical units such as are used on Christmas trees, holiday decorations and the like.

An object of my invention is to provide an illuminated ornamental device comprising few and simple parts, which is light in weight, compact and complete in itself, which may be plugged or screwed into an ordinary electric light socket, and employs baseless electric light bulbs or envelopes.

A further object of my invention is to provide a device of this class comprising essentially a two-part holder, a plurality of exhausted envelopes positioned, at one end, in said holder, the other ends of said envelopes projecting therefrom, said envelopes having filaments brought through the ends of the envelopes in the holder and connected together, therein.

These and other advantageous objects, which will later appear, are accomplished by the simple and practical construction and arrangement of parts hereinafter described and exhibited in the accompanying drawing, forming part hereof, and in which:

Fig. 1 represents an elevational view of my improved device, one of the envelopes employed therein being shown apart from and in position for insertion in the holder.

Figs. 2 and 3 represent elevational views of the bottom and top parts of the holder, respectively, Fig. 4 represents a plan view of my device, one of the envelopes or bulbs positioned therein being shown fragmentarily, Fig. 5 represents a sectional view taken on lines 5—5 of Fig. 1, Fig. 6 represents an elevational view of a baseless envelope of the type employed in my device, wherein the lead-in wires are brought through the envelope, Fig. 7 represents a perspective view of the preferred form of contact member employed in my device, Fig. 8 represents a plan view of the blank from which the same is made, and Fig. 9 represents a perspective view of the form of contact member employed in my device for connection with the electric plug, within the holder.

My device comprises essentially the holder 1, which may be made of any suitable material, and may be of any desired ornamental configuration. The holder 1 comprises essentially a bottom part 2 provided with an electric plug 3 for electrical connection with an electric socket (not shown) and a top part 4. A plurality of baseless exhausted envelopes 5 having filaments 6 provided with lead-in wires 7 brought through the envelopes, are positioned in the holder and electrically connected together therein, as will be presently more fully set forth. The holder parts 2 and 4 are provided with complementary recesses 8 so that when the said parts are secured together by any suitable means, such as by pins passing through apertures 9 therein, the recesses cooperate to provide radial sockets, as shown in Figs. 4 and 5. The holder parts 2 and 4 are further provided with narrow longitudinal grooves 10 at the edges of the recesses 8, (see Figs. 2 to 5 inclusive).

Contact members 11 are fixed in the bottom part 2 of the holder in any suitable manner, preferably by positioning the same in slots 12 therein (see Fig. 2); the opposite ends 13 of the contact members 11, which are bent at an angle thereto and curved, rest in adjacent recesses 8 (see Figs. 2 and 5); the contact member ends 13 are provided with depressions 14 resting in the grooves 10 as shown in Figs. 2 and 5.

To insert an exhausted envelope 5 into the holder 1, the envelope is aligned with the recesses 8 as shown in Fig. 1 so that the lead-in wires 7, which embrace the side of the envelope are aligned with the grooves 10 and then the envelope is slid into the holder.

Excessive insertion of the envelope 5 in the holder 1 may be prevented by any suitable means, such as by constricting the recesses 8 at the inner ends 15 thereof in the holder. The envelopes 5 are removably held in the holder 1 between the contact member ends 13 in the recesses 8, the lead-in wires 7 of said envelopes being received by and making electrical contact with the depressions 14 of the contact member ends 13 (see Fig. 5). Electrical connection with the plug 3 is made by providing two contact member ends 13' with contact strips 11' connected with the plug 3, within the holder 1, (see Fig. 2).

From the foregoing it will be seen that the construction herein disclosed provides a unique arrangement for removably and replaceably securing a plurality of exhausted envelopes 5 in a holder 1 and electrically connecting the same therein.

While in the drawing the holder is shown in the form of a star, it will be apparent that the holder may be made in any other desired or predetermined configuration and size without departing from the spirit of the invention and may employ any predetermined number of exhausted envelopes 5.

While the source of illumination of the device has been described as an exhausted envelope containing a filament with lead-in wires connected thereto, the source of illumination may within the scope of my invention comprise other electrical devices, such as neon-tubes or other rare-gas tubes or the like, in which the lead-in wires are folded over the outer walls of the tube in a construction similar to that of the envelope 5.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention what I claim as new, and desire to secure by Letters Patent, is:

1. An illuminated ornamental device comprising a holder having a top part and a bottom part provided with an electric plug, said parts being secured together and being provided with complementary recesses aligned to provide sockets, said recesses having narrow longitudinal grooves at the edges thereof, the bottom part being provided with slots between the recesses, contact members fixed in said slots, the ends of the contact members being curved and positioned in the recesses of the bottom part and extending upward into the aligned recesses of the top part, said ends of the contact members having depressed portions resting in the grooves in the recesses, and exhausted envelopes removably held between the contact member ends, the envelopes being provided with lead-in wires received by and making electrical contact with the depressed portions of the contact member ends, and means to electrically connect the contact members with the plug.

2. An illuminated ornamental device comprising a holder having a top part and a bottom part provided with complementary recesses aligned to provide sockets, the bottom part being provided with slots between the recesses, contact members fixed in said slots, the ends of the contact members being curved and positioned in the recesses of the bottom part and extending upward into the aligned recesses of the top part, said ends of the contact members having depressed portions, and exhausted envelopes removably held in the recesses of the holder between the contact member ends, the envelopes being provided with lead-in wires received by and making electrical contact with the depressed portions of the contact member ends, and means to electrically connect the contact members with a source of electricity.

3. An ornamental device for decorative purposes including, a plural part holder of insulating material with means for holding said parts together, a pair of adjacent parts having complementary aligned recesses providing lamp bulb sockets, arcuately formed metallic segments oppositely disposed in said sockets, said segments having smooth inner surfaces and means disposed between the recesses of one of the parts of the holder for positively fixing said segments in said sockets, baseless lamp bulbs having lead-in contact members for engaging said segments when said bulbs are inserted in said sockets, one of said holder parts having a current supply connector, and means to connect said segments into electrical connections with said connector.

4. An ornamental device for decorative purposes as set forth in claim 3, further characterized in that the holder is polygonal in shape and the median line of the sockets passes through the apexes of the polygonally shaped holder.

5. An ornamental device for decorative purposes including, a holder having two parts with means for holding them together, said parts being constructed so when they are fastened together a centrally located chamber is formed, said parts also having complementary recesses therein radiating outwardly from said chamber, a threaded electrical connection plug carried by one of said holder parts over said chamber for screwing the holder as a unit into a current supply socket, filament means supplied with current from said connection plug through said chamber and light-transmitting members carrying said filament means therewithin positioned in said recesses and exposed to the chamber and protruding from and around the outer periphery of the holder and illuminated by said filament means.

6. An ornamental device for decorative purposes including, a holder having two parts with means for holding them together, said parts having cooperating contours to form a common centrally located chamber and radiating tubular-shaped recesses extending from the central chamber to the exterior of the holder, a threaded electrical connection plug carried by one of said holder parts concentric with said chamber for supporting the holder and carrying current thereto, elongated glass bodies each having a portion slidably fitting within said tubular recesses and extending toward said central chamber and exposed thereto and other portions protruding beyond said holder, and means carried within said glass bodies and supplied with current from said connection plug by way of said chamber and serving to render said glass bodies luminous.

7. An ornamental device for decorative purposes including, a holder having two parts with means for holding them together, said parts having cooperating contours to form a common centrally located chamber and radiating tubular-shaped recesses extending from the central chamber to the exterior of the holder, a threaded electrical connection plug carried by one of said holder parts symmetrically thereof and extending axially of the holder in alignment with said chamber for supporting the holder and carrying current thereto, light-transmitting members having portions fitting within said tubular recesses and extending a substantial distance toward said chamber and exposed thereto and other portions protruding beyond said holder, and means carried within said light transmitting members and supplied with current from said connection plug by way of said chamber and serving to illuminate said light-transmitting members.

ELMER J. GRAF.